July 18, 1944.    L. L. CUNNINGHAM    2,353,692
CONTROL SYSTEM
Filed June 12, 1941    4 Sheets-Sheet 2

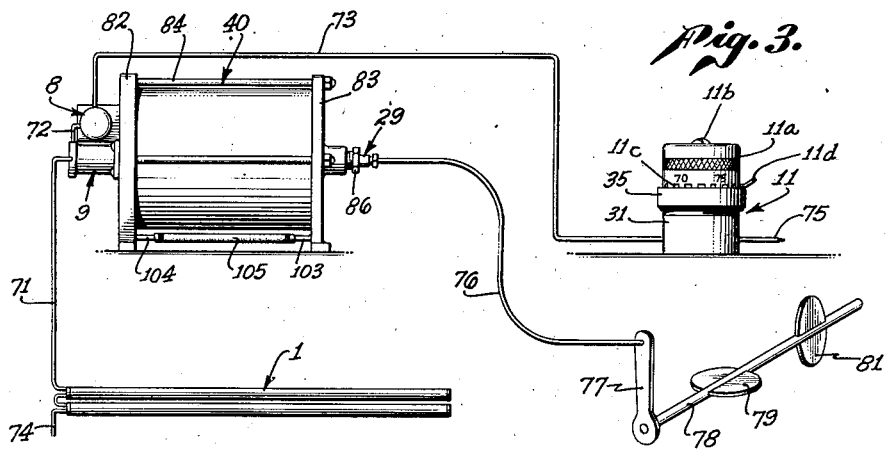
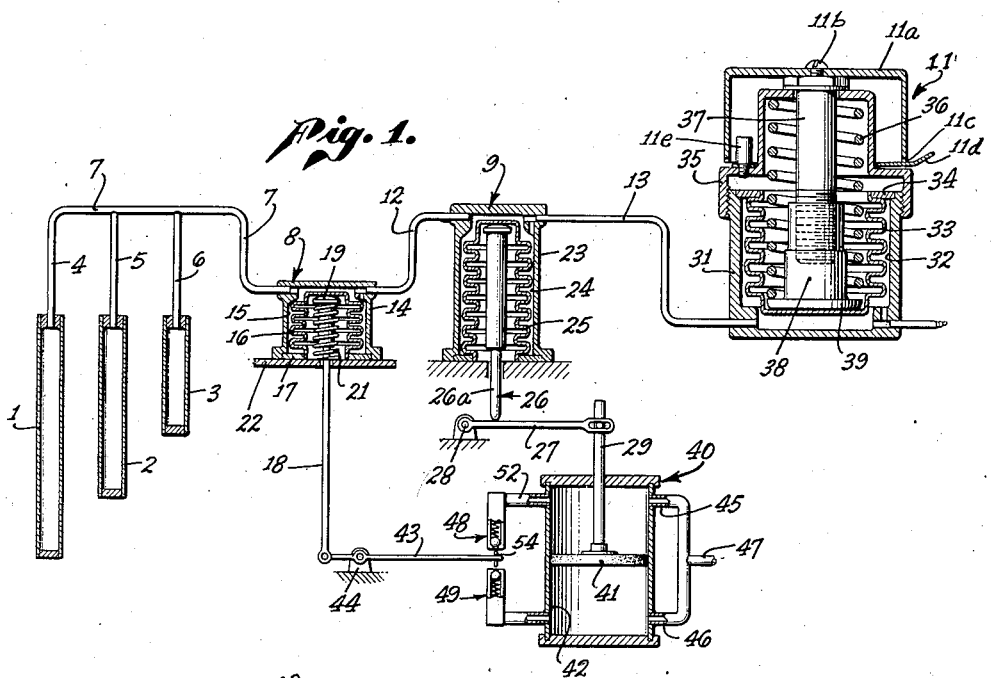
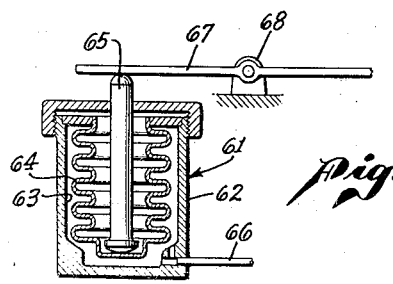
Fig. 3.
Fig. 1.
Fig. 2.
LEWIS L. CUNNINGHAM,
INVENTOR
BY
ATTORNEY.

LEWIS L. CUNNINGHAM,
INVENTOR

BY
ATTORNEY.

July 18, 1944.   L. L. CUNNINGHAM   2,353,692
CONTROL SYSTEM
Filed June 12, 1941   4 Sheets-Sheet 3

LEWIS L. CUNNINGHAM
INVENTOR

BY
ATTORNEY.

July 18, 1944.   L. L. CUNNINGHAM   2,353,692
CONTROL SYSTEM
Filed June 12, 1941   4 Sheets-Sheet 4
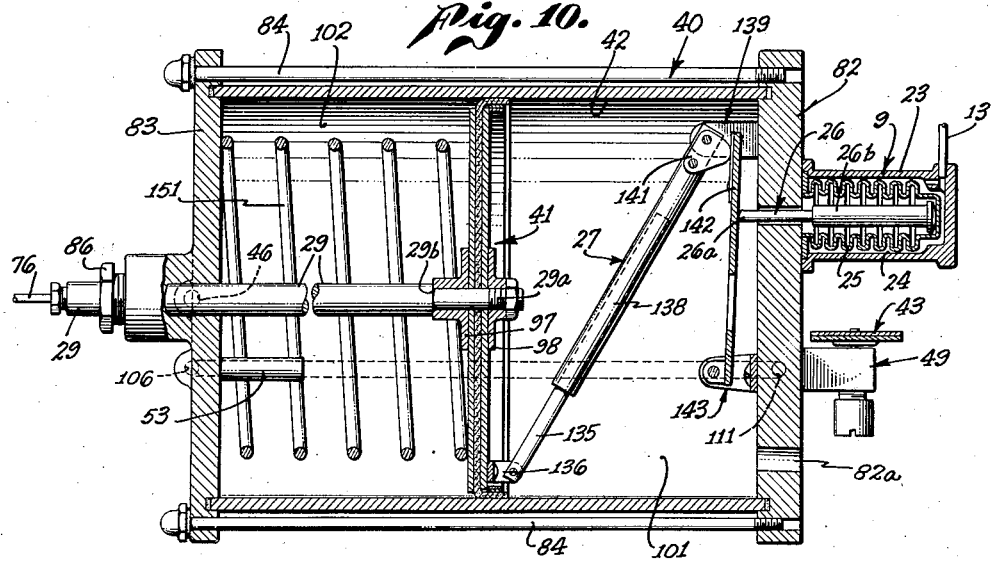
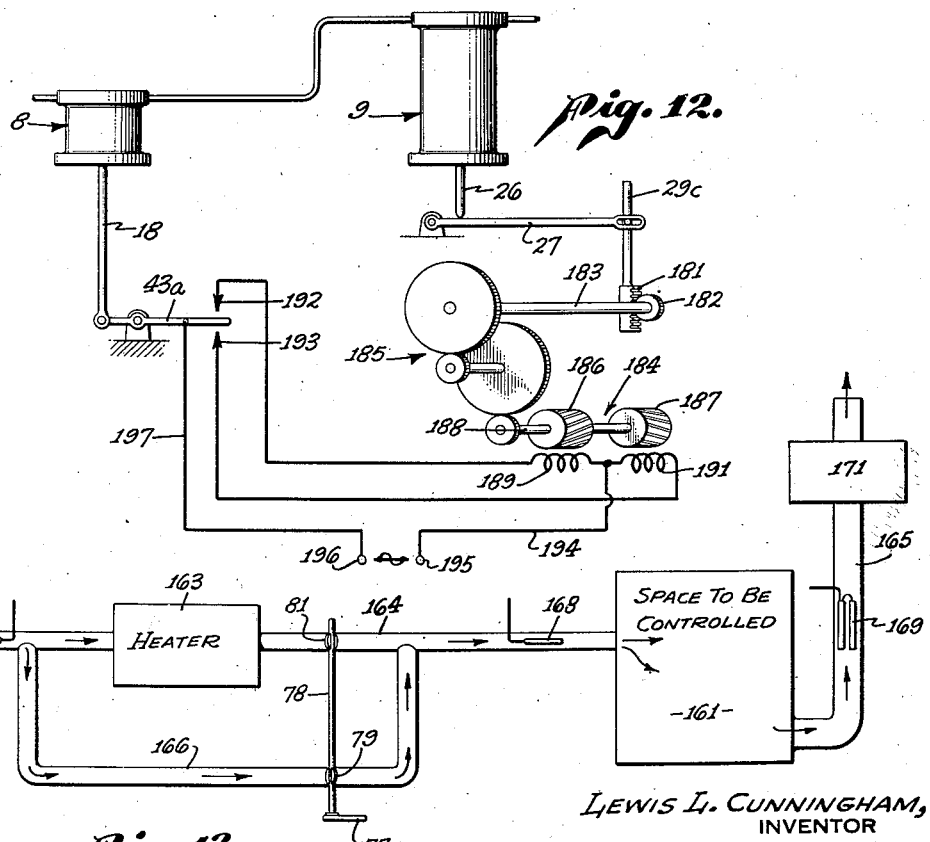
LEWIS L. CUNNINGHAM,
INVENTOR
BY
ATTORNEY.

Patented July 18, 1944

2,353,692

UNITED STATES PATENT OFFICE 2,353,692

CONTROL SYSTEM

Lewis L. Cunningham, Glendale, Calif., assignor to General Controls Co., Glendale, Calif., a corporation of California Application June 12, 1941, Serial No. 397,827

5 Claims. (Cl. 121—41)

This invention relates to systems of control in which a controlling element is moved as a result of a liquid-pressure change produced by a change in condition to which the controlling element is responsive. In such systems movement of the controlling element may be used to control the operation of suitable motor means for positioning a member to be controlled, such as a damper, an indicator, or other device which it is desired to control in response to condition changes.

A particular object of the invention is to provide a control system that may be called a "balanced liquid-pressure" type by which a device or mechanism may be "modulated" or "proportioned," wherein a confined body of liquid is subject to pressure change as a result of condition change and sets suitable motor means in operation to move the mechanism or member to be controlled to a predetermined position, which member in moving to its predetermined position operates to oppose the change in liquid pressure and upon reaching the predetermined position nullifies the pressure change and prevents further operation of the motor means until subsequent condition change produces a subsequent pressure change.

A further object of the invention is to provide a temperature-responsive control system of the balanced liquid-pressure type.

Another object of the invention is to provide an improved pressure-relief device for liquid-filled control systems.

A more specific object of the invention is to provide a combined pressure-regulating and overpressure relief device for a liquid-filled control system.

A further object of the invention is to provide an improved fluid pressure-operated motor means.

Another object of the invention is to provide an improved fluid-pressure motor means for positioning a member to be controlled in response to a change in condition, the motor means having a predetermined incremental characteristic varying with the position of the member to be controlled.

Another important object of the invention is to provide an air-conditioning system in which the temperature-changing means through which the air furnished to an enclosure is passed before it enters the enclosure, is under the concurrent control of the temperature of the air entering and leaving the enclosure and the air entering the temperature-changing means.

Further objects and advantages of my invention will either be specifically brought out in the ensuing description or will become apparent therefrom.

My invention will be more completely understood from the following specific description of the accompanying drawings, in which:

Fig. 1 is a diagrammatic view of a preferred control system according to my invention;

Fig. 2 is a diagrammatic view of a variational form of condition-responsive device which may be used with the system shown in Fig. 1;

Fig. 3 is an elevational view of a preferred control system;

Fig. 10 illustrates a modification of the motor means shown in Figs. 3–9, and is a longitudinal sectional view taken at a position corresponding to line 5—5 in Fig. 4;

Fig. 12 is a diagrammatic view of my control system as employed with an electrical motor means; and Fig. 13 is a diagrammatic view of an air-conditioning system according to my invention.

Figure 4:
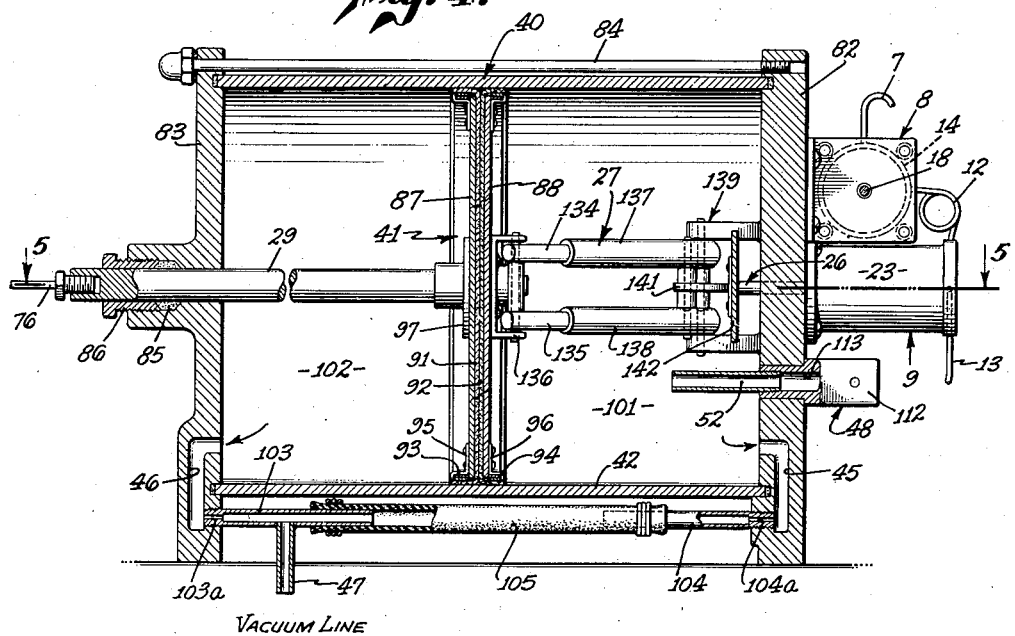
Fig. 4 is a longitudinal vertical section through the control motor illustrated in Fig. 3.

Referring to Fig. 1, condition-responsive members are indicated at 1, 2, and 3 and may comprise, as one example, temperature-responsive bulbs completely filled with a suitable liquid such as ethyl ether or other suitable liquid having a high coefficient of expansion and other desired characteristics, connected by capillaries 4, 5, and 6 to a main capillary 7. The bulbs 1, 2, and 3 are adapted to cause the outflow or inflow of liquid through their associated capillaries upon the rise and fall respectively of their temperatures. In general, if all of the bulbs are subjected to a change in temperature at the same time, or if only one is changed in temperature and the others remain at a constant temperature, such change in temperature will cause flow of liquid in the capillary 7. The bulbs 1, 2, and 3 form part of a liquid-filled, liquid-confining means comprising a controlling means 8, a restoring means 9 and a regulating and relief means 11, the capillary 7 being connected to the controlling means 8. The controlling and restoring means are connected by a capillary 12, and the regulating and relief means 11 is connected to the restoring means 9 by a capillary 13.

The controlling means 8 comprises relatively rigid wall means 14 defining a generally cylindrical chamber 15 with which the capillaries 7 and 12 communicate. The controlling means 8 further comprises a relatively flexible wall 16 formed for convenience as a flexible metal bellows suitably secured at its outer end to a washer 17 which engages the wall means 14 and closes the chamber 15. The controlling means 8 further comprises a controlling element such as an operating or piston rod 18 which extends through the washer 17 and is provided with an enlarged end portion 19 which engages the bellows 16 and is biased toward the bellows by a compression spring 21 which at one end engages the enlarged portion 19 of the rod 18 and at the other end engages a plate 22 suitably secured to the wall means 14.

The restoring means 9 is constructed similarly to the controlling means 8 and comprises relatively rigid wall means 23 defining a chamber 24 which is closed on one side by a flexible metal bellows 25 and is in connection with the capillaries 12 and 13. A restoring element such as an operating or piston rod 26 is mounted with one end engaging the bellows 25 and the other end engaging a link 27 which is pivotally mounted at one end to a suitable support 28, and is slidably and pivotally connected at its other end to a piston rod 29 which in this case is adapted for movement in a direction parallel to the direction of movement of the rod 26 and may be connected to or may comprise the member to be controlled or positioned.

The regulating and relief means 11 may comprise relatively rigid wall means 31 defining a generally cylindrical chamber 32 which is open at its upper end. The open end of the chamber 32 is closed by a flexible metal bellows 33 which is secured to a washer 34 which is in turn secured in a recess in the wall means 31. A cap 35 is shown threadedly engaging the outside of the upper end of the wall means 31 and a compression spring 36 is shown in position around a tension member such as a bolt 37 which extends through the cap 35 and threadedly engages a foot member 38 having an enlarged bottom portion 39 which engages the lower end of the bellows 33. The compression spring 36 exerts its force between the inside of the cap 35 and the portion 39 of the member 38 and the force or loading on the spring is adjusted by relative movement of the members 37 and 38. The members 35, 36, 37, and 38 comprise preloaded spring means. The value of this force is such that for all normal pressures obtained in the chamber 32, there is no movement of the member 39 with respect to the cap 35. When excessive pressures are obtained in the chamber relative movement of the members 38 and 35 occurs, whereby the pressure is relieved by movement of the bellows 33 to increase the size of the chamber 32 without rupturing the walls of the liquid-confining means.

As pointed out previously, the entire system is filled with liquid and the relative volume of liquid contained in the chambers 15 and 24 for any given temperature at the bulbs 1, 2, and 3 and position of the member 29, is adjusted by relative rotation of the members 37 and 38 while the cap 35 remains stationary on the wall means 31 to which it is tightly secured. This rotation varies the amount of liquid contained in the chamber 32 and with a given amount of liquid in the chamber 24 causes variation in the amount of liquid in the chamber 15. A dial cap 11a calibrated in temperature is secured to the upper end of bolt 37 by a screw 11b for rotating the bolt with respect to the stirrup 38 which remains stationary as a result of the spring friction. The lower edge of cap 11a is provided with notches 11c engaged by a spring 11d secured to cap 35 by a screw 11e. The free end of the spring is depressed when it is desired to turn cap 11a with respect to cap 35.

The piston rod 29 is shown secured to a piston 41 which is adapted for movement in the cylinder 42 comprising a control motor means 40 according to this invention. The piston 41 is shown in the mid position of its stroke and it may be assumed for the purposes of example that the chambers 15 and 24 each contain what may be termed their "normal" volume of liquid, the rods 18 and 26 each being at positions intermediate the ends of their strokes. Furthermore, it may be assumed that the temperatures existing at the bulbs 1, 2, and 3 are such that there is no flow through the capillary 7 into or out of the chamber 15. Under such conditions the operating rods 18, 26, and 29 remain stationary and a valve-operating lever 43, which is constrained to move with the rod 18, as by pivotal connection to one end of the rod 18, remains stationary in the central portion of the stroke. The lever 43 is pivotally secured intermediate its ends to a support 44.

The motor means is provided with air outlet connections 45 and 46 establishing connection between the cylinder 42 at positions on opposite sides of the piston 41, and a vacuum line connection 47 leading to a suitable subatmospheric pressure source, not shown. The motor means is further provided with valve means such as a pair of normally closed, inwardly opening, ball-check valves 48 and 49 closing the ends of air inlet conduits 52 and 53 communicating with the cylinder 42 on opposite sides of the piston 41.

When both of the valves are closed and a balanced load is connected to the member 29, the pressures in the cylinder on both sides of the piston 41 are equal and the piston remains at rest, irrespective of its position. Opening of the valve 48 causes an increase in pressure on the upper side of the piston and downward movement of the piston, while opening of the valve 49 causes reverse movement. The valve-operating lever 43 is provided with suitable pin 54 which is adapted to open the valves 48 and 49 upon movement of the lever toward the respective valves. Suitable restriction is placed in the line 47 so that air can enter through the valves 48 and 49 faster than it can be withdrawn from the cylinder through the line 47.

Assuming now that a rise in temperature occurs at the bulbs 1, 2, and 3, the pressure in the liquid-confining system rises and liquid flows through the capillary 7 toward the respective members 8, 9, and 11. Under normal conditions the only wall in the system which can yield or move in response to this pressure change is the bellows 16 which in moving causes downward movement of the controlling element or operating rod 18 and an increase in the volume of liquid contained in the chamber 15. There can be no change in volume in the chamber 24 at this time, since the bellows 25 or second movable wall means forming part of the liquid-confining means is held by the operating rod 26 which is in turn held in position by the member 29 of the control motor. The bellows 33 is prevented from yielding by the action of the preloaded spring 36 which will not yield until abnormal pressures are obtained in the chamber 32.

The above described downward movement of the operating rod 18 moves the pin 54 into contact with the valve 48, opening this valve and producing downward movement of the piston 41. This downward movement, through the agency of the link 27, produces downward movement of the restoring element or operating rod 26 of the restoring means 9 and results in an increase in volume of the chamber 24 through movement of the second movable wall means or bellows 25. The bias on the wall means 16 such as produced by the spring 21, causes upward movement of the operating rod 18 and bellows 16 so as to decrease the liquid pressure in the chamber 15 and the volume of liquid contained in the chamber 15 as the volume in the chamber 24 increases, and returns the volume and the pressure of the liquid in the chamber 15 to its normal value. When this condition is reached, the valve-operating lever 43 has returned to its central position and the valve 48 is again closed, bringing the piston 41 to rest at its new position.

A decrease in temperature will cause withdrawal of liquid through the capillary 7 from the chamber 15 and upward motion of the controlling member or operating rod 18. The pin 54 then moves to open the valve 49 to introduce air through the tube 53 into the cylinder, causing upward movement of the member 29 and the operating rod 26. Upward movement of the rod 26 results in discharge of liquid from the chamber 24 through the capillary 12 to the chamber 15 and downward movement of the operating rod 18 to restore the valve-operating lever 43 to its neutral position in which the valves 48 and 49 are closed and the piston 41 is at rest.

It may be seen from the above description that the member 29 moves to a given position for any given temperature condition existing at the bulbs 1, 2, and 3 and it reaches its central or normal position when the chambers 15 and 24 each contain their normal volumes of liquid and a normal temperature exists at the bulbs 1, 2, and 3. If the same operation is desired at another normal temperature, for example at a lower temperature, liquid is expelled from the chamber 32 by depressing spring 11d and turning dial cap 11a to move stirrup 38 downward sufficiently to fill the chambers 15 and 24 to their normal volumes, when the bulbs 1, 2, and 3 are at the new normal temperature and the piston 41 is maintained in its normal position.

The apparatus shown in Fig. 1 is not necessarily limited to control in response to change in temperature, but may be made responsive to other conditions. For example, the temperature bulbs 1, 2, and 3 which have relatively rigid walls and do not appreciably change in volume with a change in condition, may be replaced by a chamber having relatively movable walls and which changes in volume with a change in condition to effect a change in volume and pressure of the control chamber 15. An example of such a liquid-filled condition-responsive member is indicated at 61 in Fig. 2, and comprises relatively rigid wall means 62 defining a generally cylindrical chamber 63 closed at its upper ends by a flexible metal bellows 64 and provided with a plunger 65 bearing against the bellows 64 and adapted upon vertical movement to admit or expel liquid through a capillary 66 which may be connected to the capillary 7. An operating lever 67 is shown pivotally mounted on a suitable support 68 and in engagement with the upper end of the plunger 65. The operating lever may be moved in response to any condition, for example, it may be weight-responsive, velocity-responsive, movement-responsive, or responsive to any other condition capable of producing vertical movement of the plunger 65.

I have illustrated in Figs. 3 through 9, a control system of the type illustrated diagrammatically in Fig. 1. In Figs. 3-9 and in Figs. 1 and 11 the parts indicated diagrammatically in Fig. 1 are reproduced in detail, and unless the context clearly indicates otherwise, the details of the parts will be the same as in Fig. 1 and will be given the same numbers. In Fig. 3 a complete system is illustrated in which the control and restoring means 8 and 9 are mounted directly on the motor means 40. In this particular instance temperature bulbs indicated at 1 are connected by a capillary 71 directly to the means 9 and the means 8 and 9 are connected by a capillary 72, the means 8 and 11 being connected by a capillary 73. Capillaries 74 and 75 are shown extending from the means 1 and 11 and are used for filling the system with liquid. After the system is filled and all air is removed in accordance with conventional practice, these capillaries are pinched off and suitably sealed. As one example of an application of my control system, the piston rod 29 is shown connected through a suitable flexible shaft 76 to an operating lever 77 secured to a damper shaft 78 carrying a pair of dampers 79 and 81 arranged at 90° to one another. Thus, the rotation of the shaft 78 and the positioning of the dampers is under the control of the temperature-responsive bulbs 1.

Referring to Figs. 3 to 9, the motor means 40 is shown as comprising a cylinder 42 having end walls 82 and 83 suitably secured together by tension rods 84. The end wall 83 is provided with a suitable stuffing box 85 and packing gland 86 through which the piston rod 29 extends. The piston 41 comprises a pair of circular plates 87 and 88 compressively engaging oppositely facing flexible packing cups 91 and 92 which are held in sealing enagagement with the walls of the cylinder 42 through the agency of spring expander rings 93 and 94, each held in position by a plurality of clips 95 and 96 secured to the plates 87 and 88, respectively. The plates 87 and 88 are compressively engaged between a pair of flanged members 97 and 98 carried on reduced diameter inner end portion 29a of the member 29, the member 98 threadedly engaging the portion 29a and the member 97 engaging shoulder 29b at the outer end of the reduced portion 29a.

End wall 82 is shown provided with air outlet passage 45 communicating with operating space 101 formed in the cylinder 42 between end wall 82 and the movable wall means or piston 41, while end wall 83 is provided with outlet passage 46 communicating with operating space 102 provided in the cylinder 42 between end wall 83 and piston or movable wall means 41. The vacuum line connection 47 leads to a tube 103 which is threaded into the end wall 83 and communicates with passage 46. A second tube 104 is shown threaded into the end wall 82 and communicating with the passage 45. Communication between tubes 103 and 104 is provided by flexible tube 105 which is used in preference to a metal tube in order to reduce vibration failures when the motor is used in locations subject to vibrations such as in aircraft. (See Fig. 4.)

The valves 48 and 49 are shown carried on the end wall 82 and the valve 48 communicates directly with the space 101 through a short inlet tube 52. The inlet tube 53 communicates with the space 102 and is carried on the end wall 83. Communication between the inlet tube 53 and the valve 49 is provided through a passage 106 in the wall 83, tubes 107, 108, and 109, and the passage 111 in the wall 82. (See Fig. 6.)

Figure 8:
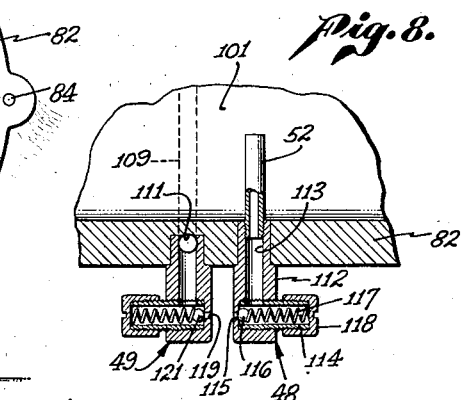
Fig. 8 is a sectional detail taken along line 8—8 in Fig. 7.

The valves 48 and 49 are shown in detail in Fig. 8 and are similarly constructed. Thus, the valve 48 is shown as comprising a member 112 threadedly engaging the wall 82 and provided with a bore 113 extending into one wall of a threaded nipple 114 extending into the member 112 at right angles to the bore 113. The member 112 is further provided with an air inlet opening 115 alined with the axis of the nipple 114 and facing the valve 49. A ball 116 is shown seated in the opening 115 to close the opening and is biased to this position by compression spring 117 located in the nipple and held in position by a cap 118 threadedly engaging the outer end of the nipple. The air inlet opening and ball of the valve 49 are indicated at 119 and 121, respectively.

Figure 7:
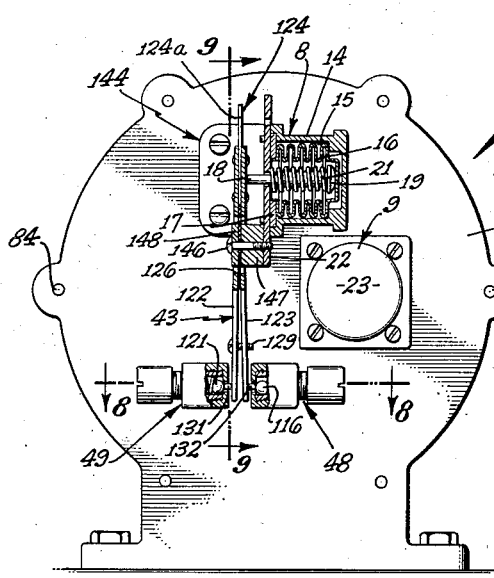
Fig. 7 is an end elevation of the control motor showing the valves and control mechanism.
Figure 9:
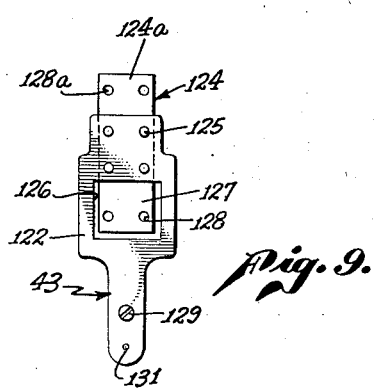
Fig. 9 is an elevational detail of the valve-operating lever taken in a plane corresponding generally to that indicated by line 9—9 in Fig. 7.

The valve-operating lever 43 is shown in detail in Figs. 7 and 9 and is shown as comprising a main body portion formed as a pair of identical spring leaves 122 and 123 positioned on opposite sides of another spring leaf 124 and secured together at their upper ends and to the spring leaf 124 by rivets or the like indicated at 125. The central portions of the leaves 122 and 123 are cut away as indicated at 126 to expose lower portion 127 of the leaf 124, suitable mounting openings 128 being provided in the lower portion of the leaf 124 for mounting the valve-operating lever as will be brought out subsequently. The leaves 122 and 123 are preferably so shaped as to be biased apart by their natural resiliency and are prevented from moving apart by an adjusting screw 129 which threadedly engages the leaf 123 and passes through the leaf 122 and may be turned to vary the spacing between the leaves 122 and 123. Each of these leaves is provided with a valve-operating pin 131 and 132, respectively.

Figure 5:
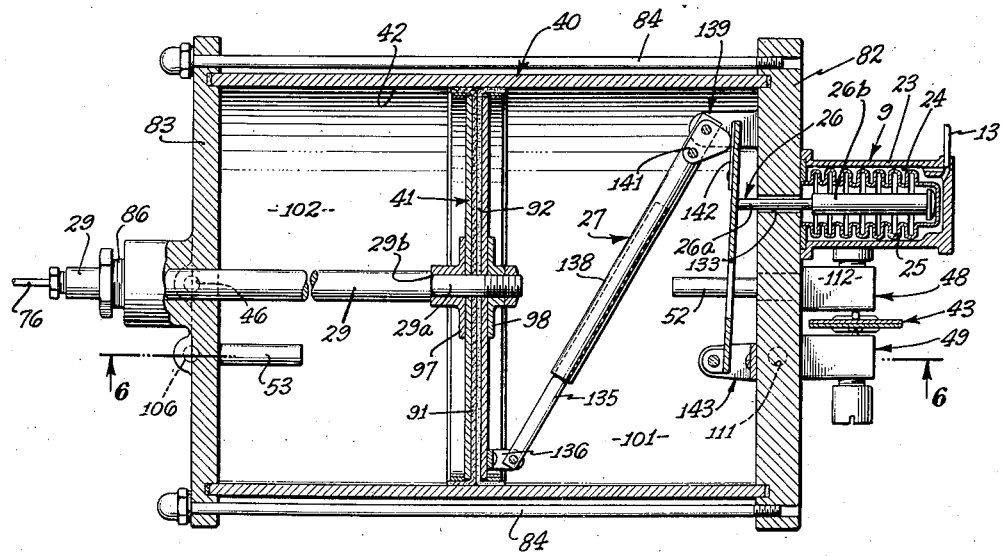
Fig. 5 is a longitudinal section taken along line 5—5 in Fig. 4.
Figure 6:
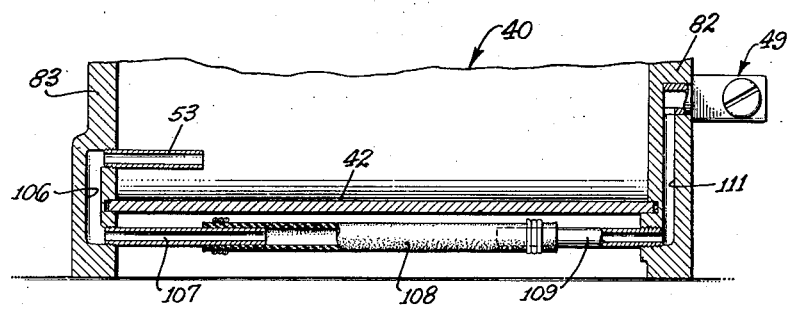
Fig. 6 is a partial longitudinal section taken along line 6—6 in Fig. 5.

Referring to Figs. 4 and 5, the restoring means 9, corresponding in construction to that shown in Fig. 1, is shown mounted on the outside of the wall 82 with its operating rod 26 extending through an opening 133 in the wall in operative association with a mechanism 27 corresponding to the lever mechanism 27 of Fig. 1. This mechanism is shown as comprising a pair of rods 134 and 135 pivoted at one end to a bracket 136 carried on the piston 41 and extending in telescoping engagement within a pair of tubular members 137 and 138 which are pivotally secured to a mounting bracket 139 carried on the wall 82 within the cylinder. The restoring mechanism is further provided with a cam 141 located adjacent the mounting bracket 139 and secured to the tubular members 137 and 138. The cam 141 is shown in contact with one side of a cam follower 142 adjacent one end thereof, the other end of the cam follower being pivotally secured to a mounting bracket 143 carried on the wall 82 within the cylinder.

The operating rod 26 engages the other side of the cam follower 142 at a position intermediate the position of contact of the cam and the mounting bracket 143. The outer end of the operating rod 26, indicated at 26a, is preferably of reduced diameter so as to enter the opening 133 with sufficient clearance, while the inner end of the member 26, indicated at 26b, is of somewhat larger diameter than the opening 133 to prevent the member 26 from entering too far into the cylinder. It should be apparent that longitudinal movement of the piston is translated into angular movement of the cam 141 through the agency of the telescoping members 134 and 135, and 137 and 138, and that this angular movement is translated into a longitudinal movement of the operating rod 26 through the agency of the cam follower 142. Thus, as the piston moves toward the wall 83, a movement in a corresponding direction is imparted to the operating rod 26. A reverse movement is created when the piston moves toward the wall 82, the member 26 following the cam follower 142 because of the pressure imparted to the liquid through the agency of spring 21.

Referring to Fig. 7, the controlling means 8 is shown mounted on the outside of the wall 82 above the restoring means 9 with the axis of the operating rod 18 substantially horizontal and parallel to the face of the wall 82, the means 8 being carried on a suitable mounting bracket 144. The valve-operating lever 43 is carried on the mounting bracket 144 and is secured thereto by a plurality of screws 146 passing through the openings 128 shown in Fig. 9, a suitable spacing block 147 being provided to hold the lever away from the mounting bracket and a suitable clamping block 148 may be provided between the head of the screw 146 and the portion 127 of the leaf 124, to hold this leaf in firm engagement with the spacing block whereby the desired spring action may be obtained. The upper end of the leaf 123, substantially centrally of the position of the rivets 125, is in contact with the outer end of the operating rod 18 and is biased to contact therewith through the action of the leaf spring 124, whereby the lever follows the rod 18 as it moves to the right.

When the chamber 15 contains its normal volume of liquid as previously defined, the valve-operating lever is in its central position as indicated in Fig. 7. The spacing between the leaves 122 and 123 is adjusted by means of the screw 129 to bring the pins 131 and 132 into contact with the balls 116 and 121, respectively, and preferably to unseat the balls slightly to allow a restricted increase of air through the openings 115 and 118, respectively. (See Figs. 7 and 8.)

The operation of the motor shown in Figs. 3 through 9 is exactly the same as described in connection with Fig. 1. An increase in temperature results in an increase in the volume of liquid in the chamber 15 and the movement of the lever 43 to open the valve 48 and close the valve 49. Air then enters the chamber 101 through the tube 52 and the piston moves toward the wall 83. Such movement is transmitted through the cam 141 and cam follower 142 to the operating rod 26 which moves to increase the size of the chamber 24. Liquid is then forced from the chamber 15 through the action of the biasing spring 21 through the capillary 12 into the chamber 24. When the amount of liquid in the chamber 15 again reaches its normal value, the valve-operating lever 43 reaches its central position as shown in Fig. 7 and no further movement of the piston occurs. When liquid is withdrawn from the chamber 15 through the action of the condition-responsive means, the piston 41 moves in the opposite direction and acts to expel liquid from the compensating chamber 24 and deliver it to the control chamber 15 through the capillary 72 to restore the volume of liquid in the chamber 15 to its normal value and bring the piston to rest at its new position.

In order for the motor means to operate in the above specified manner, it is necessary that the parts be so proportioned that opening of either of the valves 48 and 49 will allow air to enter the operating spaces at a greater rate than it can be withdrawn therefrom through the vacuum line 47. In order that this condition may be obtained, suitable means is provided for restricting the outflow of air to the vacuum line. For example, the tubes 103 and 104 may be provided with highly restricted orifices indicated at 103a and 104a.

The above description of the operation of the motor means has been based on the assumption that the piston rod 29 is connected to a balanced load, in which case the piston will come to rest when both the valves 48 and 49 are closed or when they are both opened by equal amounts. However, when the load is unbalanced, the piston will come to rest at a position where the pressure differential in the chambers 101 and 102 is just sufficient to balance the load. For example, if the piston is biased toward the wall 82 by the load or by the other means, the valve 48 will be open to a greater extent than the valve 49 when the piston comes to rest.

In this connection, it may be noted that, when the piston is at all times biased in the same direction, either by means of a specifically applied bias or a bias provided by the load, it is unnecessary to provide air inlet and vacuum connections on both sides of the piston. For example, if the piston is at all times biased toward the wall 82, the chamber 101 may be opened to the atmosphere and the valve 48 and the associated connections to the chamber 101 may be omitted as indicated in Fig. 10. An opening 82a is shown in the wall 82. The bias on the piston 41 is shown in this case as comprising a compression spring 151 engaging the inner face of the wall 83 and the piston 41. Except for the omission of the packing cup 91 and its associated parts along with the equipment previously mentioned, the construction of the motor means illustrated in Fig. 10 is otherwise the same as that previously described. The rest position of the piston 41 in response to change in condition is reached when the valve 49 is opened sufficiently to bring the pressure in the chamber 102 to balance the force provided by the biasing spring and any other load provided on the shaft 29.

Figure 11:
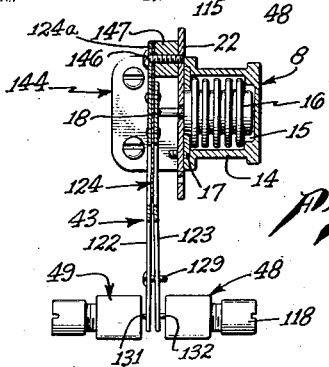
Fig. 11 is a partly sectional elevational view illustrating the manner of mounting the valve-operating lever when the motor means is to be used with a superatmospheric pressure source.

The forms of motor means above described are also adapted for use with a superatmospheric pressure supply. In order to obtain operation with a superatmospheric pressure supply connected to the tube 47, it is necessary to reverse the action of the valves 48 and 49. Referring to Figs. 9 and 11, it will be noted that the upper end of the spring leaf 124, indicated at 124a, extends beyond the upper ends of the leaves 122 and 123 and is provided with a pair of mounting holes 128a. In Fig. 11 the valve-operating lever 43 is shown mounted on the bracket 144 through the agency of screws 146 extending through holes 128a, spacer block 147, and pressure block 148. It will be noted that an increase in volume in the chamber 15 moves the lever 43 to open the valve 49 when the lever is mounted with its pivot point above the operating rod 18 as it is in Fig. 11. In Fig. 7 the pivot point of the valve-operating lever is located below the operating rod 18 and between the operating rod and the valves, whereby an increase of the volume in the chamber 15 causes opening of the valve 48. When the same change is made in Fig. 10 in the mounting of the valve-operating lever, it is necessary to reverse the direction of bias applied to the piston 41. For example, the spring 151 may be replaced by a tension spring or the compression spring may be moved to the opposite side of the piston 41 to bias the piston away from the wall 82.

It should be noted that, other things being equal, the shape of cam 141 determines the incremental characteristics of the motor means, whereby a given change in condition will produce different predetermined changes in position of the piston 41 depending upon position of the piston when the change in condition occurs. This follows since movement of the cam actuates the restoring means which must move a predetermined amount to restore a predetermined volume of liquid in the controlling means for a given change in condition. Hence, the incremental characteristics of the system may be changed by changing the shape of cam 141.

It should be noted that the normal positions of the valve-operating lever or controlling element and corresponding normal liquid volume or pressure of the controlling means varies with different motor means, depending upon the load condition and other conditions. However, in each case normal conditions obtain when the motor means holds the member to be positioned stationary at a position within the limits of its range of positions.

The control system of this invention is not limited to use with fluid-pressure motor means but may be used to control other forms of motor means such as an electrical motor means. Referring to Fig. 12, the member to be positioned is indicated at 29c and is comparable to the piston rod 29 of Fig. 1. In this case, the member 29c is connected to a rack 181. Cooperating with the rack 181 is a pinion 182 which is carried by and secured to a main operating shaft 183. The main operating shaft is connected to a suitable reversible motor means 184 through a reduction gearing indicated generally at 185. The reversible motor means is shown as comprising a pair of oppositely acting induction motors having rotors 186 and 187, both of which are secured to a common rotor shaft 188. Field windings 189 and 191 cooperate with the respective rotors 186 and 187.

The arrangement of the parts in the reversing motor means is such that energization of the field coil 189 produces counterclockwise rotation of the main operating shaft 183 as viewed from the left. The fields 189 and 191 are shown connected in series to opposing switch contacts 192 and 193. A point in the series circuit between the two fields is connected through a conductor 194 to one terminal 195 of an alternating current source. The remaining terminal 196 of the source is connected through a conductor 197 to a switch arm 43a corresponding to the valve-operating lever 43 of Fig. 1.

Movement of the controlling member or operating rod 18 from its normal position as through an increase in liquid pressure in the controlling means 8 will cause downward movement of the operating rod 18 and establish connection between the switch arm 43a and the contact 192, connecting field coil 189 to the supply terminals 195 and 196. This results in downward movement of the member 29c and the accompanying downward movement of the restoring member or operating rod 26 to increase the volume of liquid in the restoring means 9 and restore the volume of liquid in the controlling means 8 to its normal value. This causes the connection between the contact 192 and the switch arm 43a to break, stopping the motor, and bringing the controlled member 29c to rest at a new predetermined position. Upward movement of the operating rod 18 as a result of a decrease in pressure and volume of the liquid contained in the controlling means 8 results in movement of the member 29c in the opposite direction to a new predetermined position.

An advantageous arrangement is shown in Fig. 13 for controlling the temperature of an enclosure or space 161 such as a room or airplane cabin. In this particular case the space is to be maintained at a temperature which is higher than that of the air normally available, whereby control of the heat supplied to the incoming air is required. An air inlet conduit is indicated at 162 through which air may flow to a heater 163 and thence through a conduit 164 to the space 161, air being exhausted from the space through an outlet conduit 165. In this particular example, the heater 163 is adapted to bring air passing therethrough to substantially the same relatively high temperature within the range of its volumetric capacity.

A bypass conduit 166 is shown connected to the conduits 162 and 164 to provide for bypassing air around the heater 163 and the damper shaft 78 is shown extending through the conduits 166 and 164 with the dampers 79 and 81 in the conduits 166 and 164, respectively. Rotation of the damper shaft 78 by means of the operating arm 77 results in an increase in the amount of air passed through the heater and a corresponding decrease in the amount of air bypassed through the conduit 166. (See Figs. 3 and 12.) The heater, bypass passage, and dampers comprise a controllable temperature-changing means. Obviously other temperature-changing means may be substituted therefor. For example, movement of shaft 78 may be used to control the fuel supply to a heater.

A temperature bulb 167 is shown in the conduit 162 and is responsive to the temperature of the air supplied to the temperature-changing means. Another temperature bulb 168 is shown in the conduit 164 and is responsive to the temperature of the air introduced to the space 161, i. e., the mixture of air from the heater and bypass passage. Another temperature bulb is indicated at 169 in the conduit 165 and is responsive to the temperature of the air exhausted from the space 161. The bulbs 167, 168, and 169 may all be connected to the liquid circuit of the control mechanism illustrated in Fig. 3; for example, they may be connected to the capillary 71. The action of the bulbs 167, 168, and 169 may be more clearly understood if they are considered as substitutes for the bulbs 3, 2, and 1, respectively, of Fig. 1.

The motor means 40 is thus under the concurrent control of all of the temperature-responsive bulbs 167, 168, and 169. With such an arrangement there is less tendency for variation in the temperature of the space since the temperature of the air supplied to the heater, as well as the temperature of the air leaving the heater, enters into the control of the temperature-changing means. For example, a rise in temperature at the position of any of the temperature-responsive means acts to control the temperature-changing means to decrease the heat supplied. A rise in temperature at one position accompanied by a fall at another position will produce an effect on the control mechanism according to whether the net effect of the liquid volume change results in an increase or decrease in volume in the controlling means.

In this connection, the relative volumes of the temperature-responsive bulbs is preferably substantially inversely proportional to range in temperatures to which they are normally subjected, whereby each bulb when varied in temperature over the limits of its range of temperatures, while the other bulbs are maintained at their normal temperatures, is capable of varying the temperature-changing means substantially throughout the limits of its range of control. In other words, the product of the liquid volume of the bulb 167 and its normal temperature range is substantially equal to the product of the liquid volume of bulb 168 and its normal temperature range, and is also substantially equal to the product of the liquid volume of the bulb 169 and its normal temperature range.

Obviously the heater 163 may be replaced by a refrigerator, in which case the operation of the dampers 79 and 81 is reversed. Suitable means for introducing and exhausting air from the enclosure is indicated at 171, whereby the desired flow in the conduits is obtained. Such means may comprise a fan or blower, or air scoops or vents in the case the enclosure is an airplane cabin or the like.

My invention is obviously subject to considerable modification, hence I do not choose to be limited to the examples disclosed herein, but rather to the scope of the appended claims.

I claim:
1. A motor comprising a cylinder and a cooperating piston; and a connection operated by the movement of said piston comprising a pair of members slidable with respect to each other along a substantially common axis, one of said members being pivotally mounted on said piston and the other on said cylinder so that the common axis of the members is at an angle to the axis of the motor.

2. A motor comprising a cylinder and a cooperating piston; and a connection operated by the movement of said piston comprising a rod member and a tubular member slidably receiving said rod member, one of said members being pivotally mounted on said piston and the other on said cylinder so that the axis of the members is at an angle to the axis of the motor.

3. A motor comprising a cylinder and a cooperating piston; and a connection operated by the movement of said piston comprising a rod member and a tubular member slidably receiving said rod member, one of said members being pivotally mounted on said piston and the other on said cylinder so that the axis of the members is at an angle to the axis of the motor, and a cam carried by said other of the members adjacent its pivot.

4. A motor comprising a cylinder and means forming a wall movable therein, a connection within the cylinder and having a variable length, means for pivotally mounting one end of said connection on said wall, means for pivotally mounting the other end of said connection on said cylinder, and a lever mounted in the cylinder and operated by said connection.

5. In combination: a motor comprising a cylinder and means forming a wall movable therein, means for varying the fluid pressure within said cylinder to move said wall, an independent fluid pressure system including expansible-contractible means forming a variable-volume chamber and arranged to cover an opening in a wall of said cylinder, and a mechanical connection whereby movement of said wall effects movement of said expansible-contractible means to vary the capacity of said chamber, the pressure of the fluid in said cylinder being so low with respect to that of the fluid in said independent system that said expansible-contractible means is substantially unaffected thereby.

LEWIS L. CUNNINGHAM.